April 29, 1952 A. F. STONE ET AL 2,594,821
FILING AND JOINING GAUGE FOR SAW CHAINS
Filed Dec. 5, 1950 3 Sheets-Sheet 1
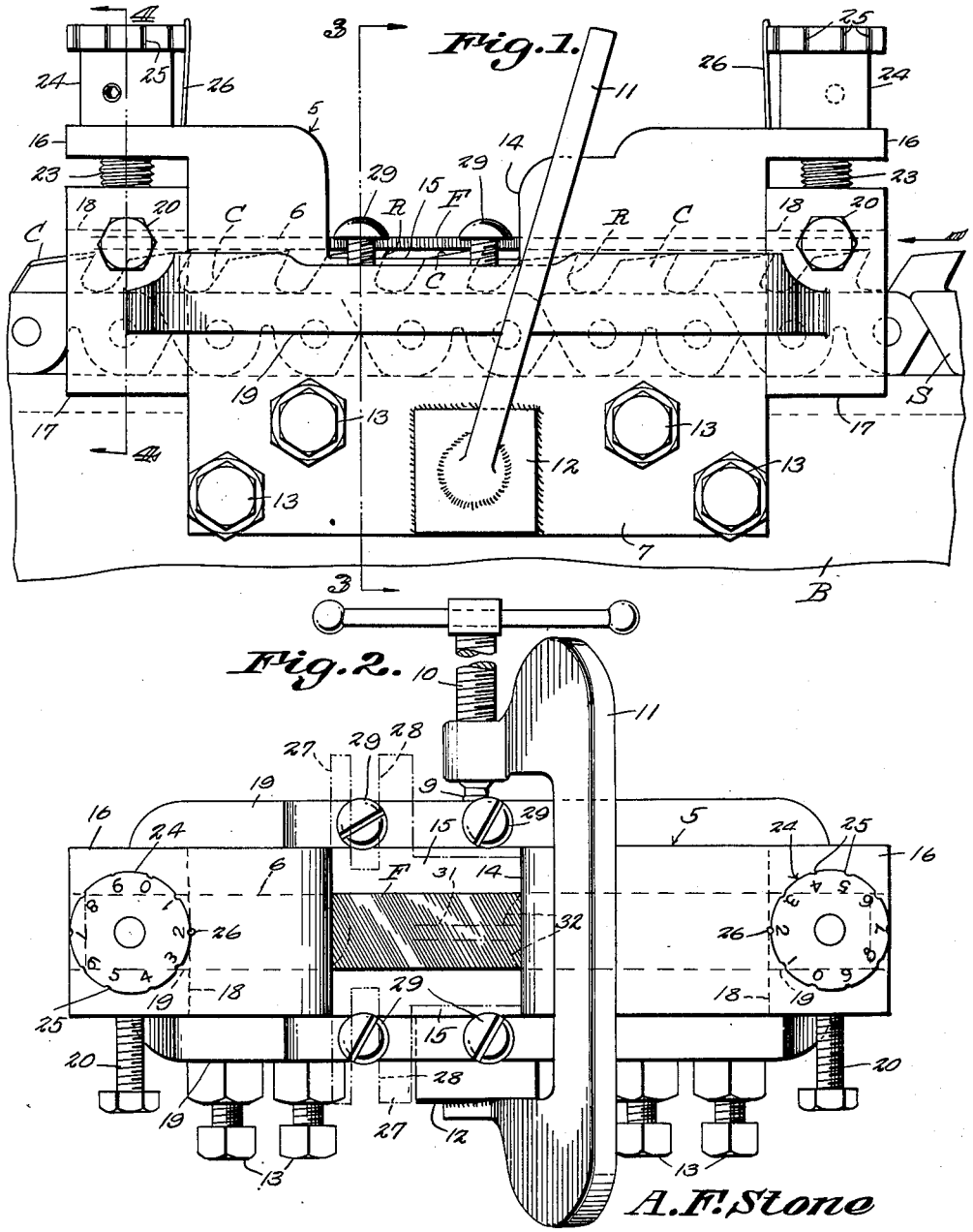
A.F.Stone
E.A.Hayden
H.W.Parker
INVENTORS
BY Ca Snow &Co.
ATTORNEYS.

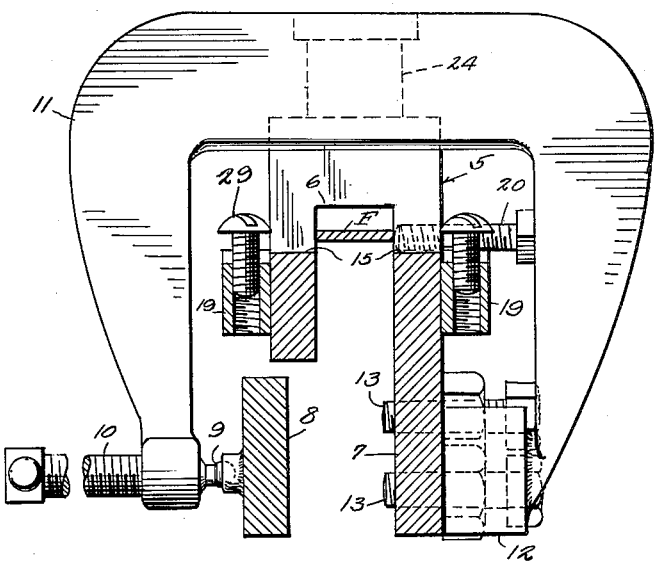
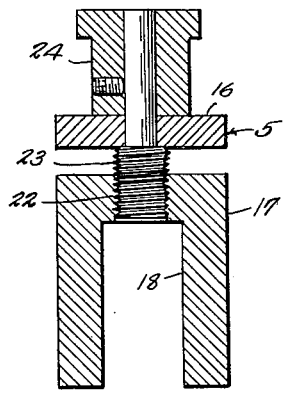
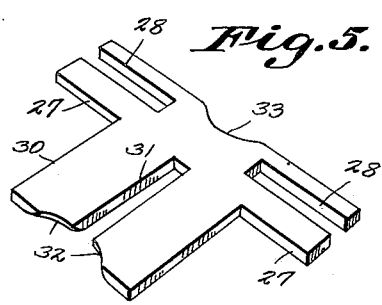
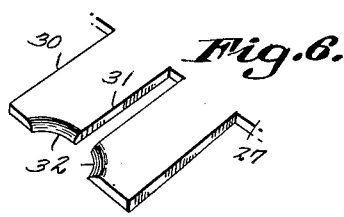
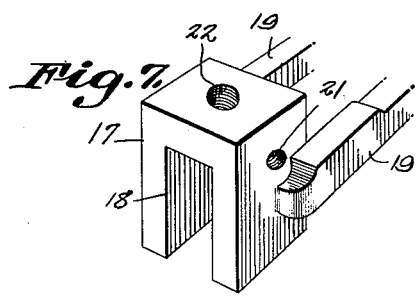

April 29, 1952     A. F. STONE ET AL     2,594,821
FILING AND JOINING GAUGE FOR SAW CHAINS
Filed Dec. 5, 1950     3 Sheets-Sheet 3
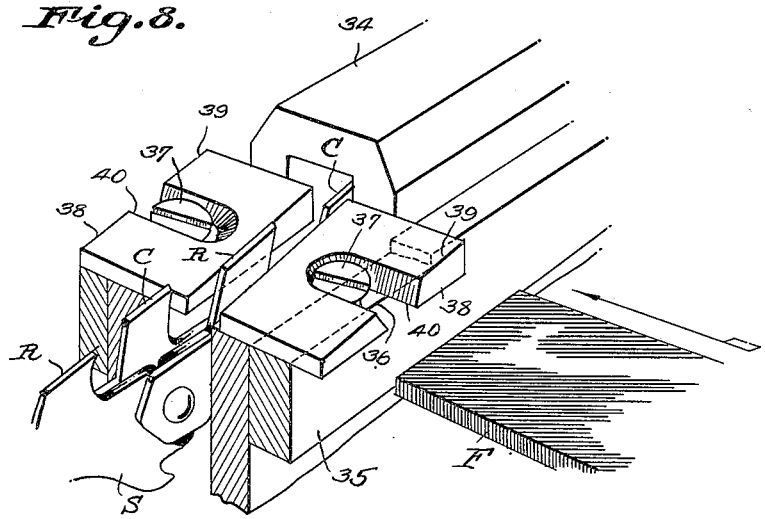
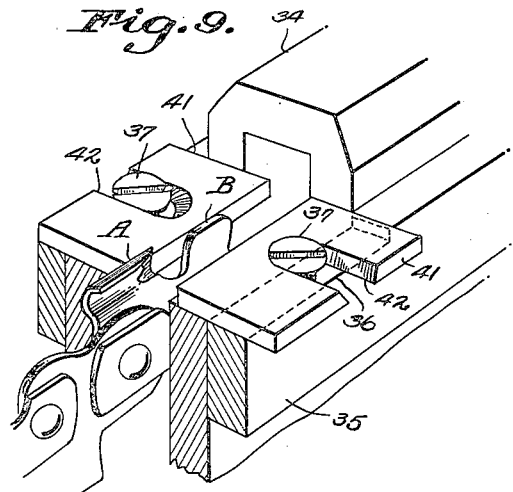
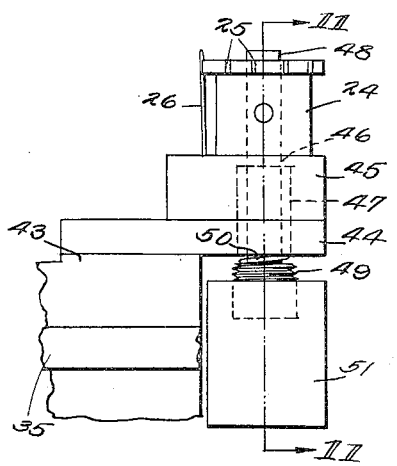
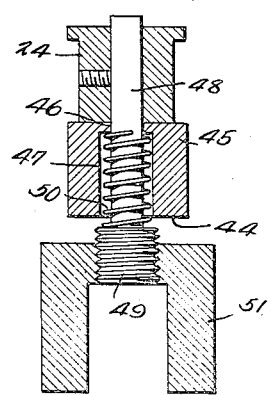
A. F. Stone
E. A. Hayden
H. W. Parker
INVENTORS.

Patented Apr. 29, 1952

2,594,821

UNITED STATES PATENT OFFICE 2,594,821

FILING AND JOINING GAUGE FOR SAW CHAINS

Albert F. Stone, Ernest A. Hayden, and
Howard W. Parker, Callahan, Calif.

Application December 5, 1950, Serial No. 199,194

7 Claims. (Cl. 76—46)

1

This invention relates to a filing and joining gauge for saw chains such as used on power chain saws.

Teeth design and arrangement, in saw chains, varies considerably. Some saw chains, called router-type chains, are provided with cutting teeth alongside each of which is a somewhat lower tooth called a depth regulator or rider which controls the depth of cut made by the cutting tooth. In other designs the cutting teeth are followed by raking teeth. While the raking teeth do not closely resemble the depth regulators of router-type chains in appearance or manner of operation, the rakers do have one characteristic in common with the depth regulators, which is that they are lower than the cutting teeth.

The saw chain is mounted upon an elongated, generally elliptical, cutter bar having a peripheral groove in which the saw chain rides, the saw chain traveling around the bar in the manner of a belt upon its pulleys. The continued cutting efficiency of the chain, in this connection, will depend upon various factors. One important factor is the proper "joining" of the cutting teeth in relation to each other, that is the reduction of all the cutting teeth to equal height. Another important factor is the provision of a proper height variation between the cutting teeth and the raking teeth, or between router-type cutting teeth and their regulators. Still another factor is the provision of a proper back slope upon the teeth.

In general, the filing of a saw chain has been a tedious manual operation involving in most cases the removal of the saw chain from the cutter bar with the teeth being filed separately by a hand file.

Concerning the above, it is an important object of the present invention to provide a device which will result in proper joining of the cutting teeth in relation to each other during the sharpening of each tooth; a proper height variation between the cutting teeth and the raking teeth; and a proper height variation between router cutting teeth and their depth regulators.

Another important object is to provide a device of the type stated which will be so constructed as to adapt it for filing a saw chain anywhere, while the saw chain is in place on the cutter bar, and this without changing the adjustment of the chain from the adjustment that is ordinarily used in sawing operation.

Another important object is to provide a device of the character described which will be

2 simple in operation, so that any chain saw operator can do a precision saw filing.

Another important object is to provide a filing and joining gauge as described which will file and join the teeth while the saw chain is being run upon the cutter bar, thus to complete the conditioning of the chain for further efficient use, in a minimum of time.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a side elevational view of a filing and joining gauge constructed in accordance with the invention, a cutter bar and saw chain being shown fragmentarily.

Fig. 2 is a top plan view.

Fig. 3 is a section on line 3—3 of Fig. 1.

Fig. 4 is a section on line 4—4 of Fig. 1.

Fig. 5 is a perspective view of one form of float plate.

Fig. 6 is a fragmentary perspective view of the float plate of Fig. 5 inverted.

Fig. 7 is a fragmentary perspective view of one of the guide blocks and connecting arms.

Fig. 8 is a fragmentary enlarged perspective view of the center portion of the device illustrating a form of float plate usable therewith, a portion of a saw chain and hand file being illustrated in proper position relative to said float plate.

Fig. 9 is a view similar to Fig. 8 but illustrating a modified form of float plate usable on another type of saw chain, said other type being illustrated in Fig. 9.

Fig. 10 is a fragmentary side elevation of one end portion of a modified form of the device.

Fig. 11 is a section on line 11—11 of Fig. 10.

Referring to the drawings in detail, a body generally designated 5 is formed with a longitudinal bottom channel 6 extending from end to end of the body and opening at opposite ends of the body so that said body can straddle a cutter bar B and saw chain S carried thereby.

One side wall of the channel 6 extends downwardly a suitable distance to provide a stationary clamp plate 7 that is an integral part of the body, while the other side wall of the channel constitutes in part a movable clamp plate 8 which, as seen from Fig. 3, is directly opposite the stationary clamp plate 7.

Threaded in the clamp plate 7 is a plurality of set screws 13 equipped with suitable lock nuts, said screws 13 adapted to be threaded against one side of the bar B, while the movable clamp plate 8 is adapted to be engaged with the other side of said bar for the purpose of mounting the body 5 rigidly upon the bar B in a selected adjusted position, so that said bar B itself comprises the base for the filing and joining operations.

Intermediate its ends, the body B is cut away as at 14 (Figs. 1 and 2) to expose the medial portion of the channel 6, thus to provide side rests 15 for a file float plate, to be described hereinafter.

The body 5 is also formed integrally with end extensions 16 (Fig. 1). The parts which have so far been described, with the exception of the cutter bar B and saw chain S, can all be considered as cooperating to provide the body or base of the device.

Mounted below the extension 16 for up and down sliding movement against the end walls of the body are the guide blocks or brackets 17 formed with the bottom channels 18 adapted to provide extensions of the channel 6, said guide blocks being rigidly connected by elongated connecting arms 19 extended longitudinally of opposite sides of the body.

Threadable into the channels 18 of the respective guide blocks are the locking screws 20, that extend through threaded openings 21 formed in said guide blocks. Formed in the top walls of the guide blocks are the threaded openings 22 into which extend the threaded studs 23 that extend upwardly through, and are swivelled in, the end extensions 16 of the body and have at their upper ends the knobs 24 rigid with the studs for rotating said threaded studs.

As particularly seen from Fig. 2, each knob 24 is formed with a series of circumferentially spaced peripheral notches 25 each associated with a suitable indicium, and receivable in a selected notch of each knob is the spring detent 26. Thus, by rotary adjustment of the respective knobs 24, the guide blocks 17 can be raised or lowered selected distances, and are retained in their adjusted positions by means of the detents 26. In this connection, we have found it particularly advantageous to space the notches at such a distance as will cause each notch to represent a vertical movement of the guide blocks of .005 inch, and thus it is seen that micro-adjustment of said guide blocks is provided, for reasons to be described.

The operation of filing and joining the cutting teeth C of the saw chain S may now be noted. In the form of chain illustrated, it may be noted that cutting teeth C will alternate with the raking teeth or rakers R.

As a first step in the operation, an ordinary straight sided file F is first positioned within the bottom channel 6 of the base, and this file is of a length that will cause the ends of the file to extend into the channels 18 of the guide blocks. Said ends of the file F are secured within the respective guide blocks by means of the locking screws 20. Before the file F is so secured, however, the guide blocks are adjusted downwardly until the file F will clear the inner or top wall of the channel 6 by a distance of, say about $\frac{1}{16}$ inch.

The set screws 13 are then adjusted so that the body will hold the file in the center of and in true longitudinal alignment with the saw chain S and its cutter bar B, when the movable clamp plate 8 is tightened against the other side of the cutter bar.

When these adjustments have been made, the movable clamp plate 8 is loosened by means of the clamp screw 7 and the gauge is positioned upon the bar, preferably near the center of the bar, with the file F resting upon two or more cutters C. The gauge is now securely tightened by means of the clamping screw 10. File F is then elevated by means of the control knobs 24, until the file will clear the highest cutting tooth C in the chain.

The saw chain S is now run manually in a reverse direction to its cutting direction, as shown by the arrow at the right of Fig. 1, while the file is lowered by means of the knobs 24 so as to make contact with, and file off a portion of, the tops of said cutters C. The procedure is continued until all the cutters C are reduced to an equal height, and this completes the filing and joining operation of the cutting teeth C.

A router-type chain illustrated in Fig. 9 and having cutting teeth A and depth regulators B, is similarly handled, that is, the chain is run manually around the cutter bar below a file F positioned as in Figs. 1 and 2, so as to join the cutters A.

The filing of the rakers R or regulators B is the next operation, and for this purpose the file F is removed. In place of the file, a float plate is utilized. At this point, it should be noted that the float plate construction and formation will differ according to the particular formation of the teeth being conditioned. The float plate illustrated in Figs. 5 and 6 and in dotted outline in Fig. 2 is one devised for the saw chain illustrated in Fig. 9 and includes side wings 27 formed with inwardly extended slots 28, through which slots extend the screws 29 threadable into the connecting arms 19 of the guide block assembly. Thus, the float plate can be tightly mounted upon the connecting arms, extending across and through the bottom of the recess 14 of the base.

The body of the float plate illustrated in Figs. 5 and 6 is further formed with a flat portion 30 in which is formed a longitudinal slot 31, this comprising a slot through which a depth regulator B can extend upwardly. The end of the body where the slot opens is formed with arcuate beveled cutaway portions 32, to provide a clearance for adjacent cutting tooth A, with which the depth regulator is integral.

The other end 33 of the float plate is formed with an inwardly extended shallow arcuate recess as particularly well shown in Fig. 5. This is to provide a clearance for the cutting tooth A next preceding the regulator B.

In use of this form of float plate, assuming that the joining of the cutting teeth A has been completed, the device is removed from the chain-saw bar and the joining file taken out. The arms 19, that support the float plate, are then raised to their maximum extent, by rotation of the control knobs 24. Should, during this operation, the control knobs move slightly past zero at the location of the counter pin 26, they are returned so that said pin enters the zero notch.

The float plate is now inserted in the recess 14 and secured by the screws 29 to the connecting arms 19, the position of the float plate being illustrated in dotted lines in Fig. 2. The gauge is now placed upon the approximate center of the cutter bar B. The float plate is now adjusted laterally so that the depth regulator B extends upwardly through the slot 31 and is then tightened down by means of the screws 29.

The user now adjusts the float plates for filing depth, by lowering the float plates through the medium of the control knobs 24 until the desired filing depth is obtained. For example, if it is desired to file the regulators so that their top surfaces are disposed a distance of .045 inch below the top surfaces of the cutting teeth A, the control knobs would be rotated a distance of nine notches, so that the counter pins 26 engage in the notches designated by the numeral "9," each notch representing a downward movement of the control arms 19 of .005 inch. If it is desired to file the regulators .025 inch below the cutting teeth, the control knobs would be rotated to notch "5," and so on. In this connection, at the time the gauge was placed on the approximate center of the cutter bar, it would have been simply positioned to rest upon the teeth, so that the top surfaces of the cutting teeth A would engage and support the roof of the channel 6.

Considering now Figs. 8 and 9, in Fig. 8 a body 34 corresponding to the body 5 except in the matter of outer configuration, is disposed between float plate arms 35 corresponding to the arms 19 in the first form of the invention. The arms 35 are provided with centrally disposed shallow depressions 36, having threaded openings in which are threaded screws 37. In the form illustrated in Fig. 8, only one pair of screws is used as compared to the two pairs illustrated in the first form of the invention.

The float plate illustrated in Fig. 8 is formed in two wholly separate pieces or sections 38, the top surfaces of which are sloped as at 39 corresponding to the angle of back rake of the teeth C or R in the form of the saw chain illustrated in Fig. 8.

Each float plate section is provided with an open ended slot 40 having beveled side walls, and on positioning of the float plate sections upon the arms 35, the screws 37 are adapted to be received in the slots 40 and threaded downwardly so as to engage the beveled side walls of the slots and securely fix the float plate sections in position. In this connection, in view of the length of the slots 40 it may be noted that each float plate section can be adjusted laterally, and therefore, the slot defined by the space between the float plate sections can be adjusted as to width, so that the float plate sections can be adjusted laterally toward or away from each other for gripping or releasing a saw chain S extending through the slot defined between the float plate sections.

The float plate illustrated in Fig. 8 is for the purpose of filing back slope upon cutter teeth C or rakers R, on a saw chain of the type illustrated in this figure. Assuming that it is desired to file back slope on the rakers R, with said rakers to be disposed a prescribed distance below the cutters C, the gauge would be positioned upon the saw chain in the same manner as described with reference to the first form of float plate, and the control knobs would be adjusted the desired number of notches. The float plate sections would then be adjusted toward the saw chain at opposite sides of the saw chain, and will prevent "wobble" of the chain in the chain saw bar groove, and will additionally provide a solid abutment engaging one side of the raker tooth being filed. The file F is now manually grasped and is reciprocated laterally over the sloped top surfaces 39, and will file back slope upon the rakers R 39, and will file back slope upon the rakers R down to the level of the inclined surfaces 39 of the float plate.

In Fig. 9 a float plate is illustrated which is like that of Fig. 8 except for having a horizontal rather than an inclined top surface. This plate is also formed in sections 41 having slots 42 receiving the screws 37. The plate of Fig. 9, however, is for use in filing depth regulators of a router-type chain, and is used alternatively to the form of float plate illustrated in Figs. 5 and 6.

The manner of use is the same as said first form of float plate, and it will be understood that when the float plate arms 35 have been lowered the selected number of thousandths of an inch, the file F is transversely reciprocated across the float plate section so as to file down the depth regulators B to the desired distance below the tops of the cutters A.

From the above it may be seen that the cutters C and rakers R, or combined routing and cutting teeth and their depth regulators, may be filed in absolute contiguity without removal of the saw chain S from the bar B, and without removal, in fact, of the entire power chain saw from its work location. Additionally, not only is the filing and joining operation carried out with the saw chain upon the cutter bar or guide plate B, but also, the previously effected adjustment of the chain upon the bar, wherein the chain was adjusted for ordinary sawing operations, need not be changed in any respect.

As previously mentioned, many types of float plates may be incorporated on the device, such as float plates having surfaces angled to file side slope on cutting teeth, float plates having rear slots for filing various angles, and others having adjustable horizontal angles for filing correct back slope on all types of saw teeth.

We have found that for most efficient use of the gauge, it should be placed on or about the center of the chain saw cutter bar B. As mentioned, most of these bars are eliptical in form. Therefore, the saw teeth are caused to strike near the center of the joining file which is straight. Since the file is supported at each end, it will have a tendency when struck at its center, to spring upwardly. Thus, we have found that where a tooth is .004 inch higher than the lower portion of the file, and this tooth is fed into the gauge by reverse running of the saw chains, the file may remove .002 inch while the springing action of the file would still allow the tooth to pass. Subsequent passes of the tooth under the file would remove the remaining .002 inch.

In Figs. 10 and 11 there is illustrated another modified form, specifically adapted to aid this springing action. In this form of the invention a body 43 is rigid with end extensions 44 which are integral or otherwise made rigid with blocks 45 having openings 46. The openings 46 are counterbored as at 47, the counterbores extending upwardly through the extensions 44 and blocks 45 and terminating short of the top surfaces of the blocks 45. Studs 48 are rotatable in the openings 46 and the control knobs 24 are rigidly secured to said studs 48. The studs at their lower ends are provided with the threaded enlargements 49 defining shoulders for engaging the lower ends of springs 50, the upper ends of which engage against the inner walls of the counterbores 47. The shoulders of the enlargements 49 are disposed slightly below the bottom surfaces of the extensions 44 so as to permit the studs 48 limited up and down movement, the studs being yieldably urged downwardly by the expanding action of the springs 50, that are held under compression.

Threaded upon the enlargements 49 are guide blocks 51 corresponding to the guide blocks 17 of the first form of the invention.

Important characteristics of the invention are also believed worthy of note, it being noted that the invention includes a means for holding and micro-adjusting a joining file or grinding tool in a manner whereby it is held with absolute rigidity thus eliminating the usual errors occurring in hand filing.

Another important characteristic resides in the construction wherein the saw chain itself is moved instead of the file to complete the joining operation, while the operation is carried out in a manner to do precision joining, with the cutter bar B itself serving as a base for the device as a whole.

What is claimed is:

1. A filing and joining gauge for saw chains comprising an elongated base having a bottom channel extending from end to end thereof, said base adapted to straddle a cutter bar and saw chain mounted on said bar, one side wall of said channel comprising a stationary clamp plate, the other side wall of said channel adapted as a movable clamp plate, said clamp plates adapted to engage opposite sides of the cutter bar for rigid mounting of the base upon the cutter bar, guide blocks mounted for up and down sliding movement on the end walls of said base, said guide blocks having bottom channels registering with the channel of the base and being adapted to support a filing means, end extensions on said base under which said guide blocks are positioned, threaded studs swivelled in said end extensions, said threaded studs being threaded in the guide blocks for up and down adjustment of said guide blocks on swivelling movement of the studs in the extensions, peripherally notched adjusting knobs rotatable with said studs and positioned above the extensions, spring detents mounted on the base and receivable in selected notches of the knobs, and connecting bars rigidly connected at opposite ends to the respective guide blocks and extended longitudinally of the base at opposite sides of said base.

2. In a saw filing and joining gauge of the type comprising an elongated base member having a saw tooth receiving groove extending longitudinally therethrough and opening through one side thereof, said base member also having a recess extending transversely therethrough and opening through the side thereof remote from the groove, said recess communicating with the groove intermediate the ends thereof, means carried by the base member for engaging the cutter bar of a chain saw and clamping the base member on the cutter bar with the teeth of the chain saw accessible through the recess, and means carried by the base member for clamping an elongated saw tooth joining tool adjacent the bottom of the groove, means for holding a saw tooth against lateral movement while filing it comprising supporting bars carried by the base member for movement in parallel relation therewith adjacent opposite sides thereof, and float plates carried by the supporting bars and extending into the recess for engaging opposite sides of a saw tooth.

3. The structure defined in claim 2 in which the float plates are adjustably mounted on the supporting bars for accommodating saw teeth of varying thicknesses.

4. The structure defined in claim 2 in which the surfaces of the float plates remote from the supporting bars are inclined to guide a file while filing the rake on a saw tooth.

5. The structure defined in claim 2 in which the supporting bars are ajustably connected to the base member adjacent opposite ends thereof.

6. The structure defined in claim 2 in which screws are carried by the base member adjacent opposite ends thereof and are threadedly connected to the supporting bars adjacent opposite ends thereof for regulating the positions of the supporting bars relative to the base member.

7. The structure defined in claim 2 in which ears are carried by the base member and project longitudinally therefrom adjacent opposite ends thereof, guide blocks are carried by the ears for adjustment in paths which lie perpendicular to the longitudinal axis of the base member and opposite ends of the supporting bars are carried by the guide blocks.

ALBERT F. STONE.
ERNEST A. HAYDEN.
HOWARD W. PARKER.

REFERENCES CITED

The following references are of record in the file of this patent:

UNITED STATES PATENTS

| Number | Name | Date |
|---|---|---|
| 864,907 | Murback | Sept. 3, 1907 |
| 2,339,509 | Olson | Jan. 18, 1944 |
| 2,415,137 | Johnson | Feb. 4, 1947 |
| 2,420,468 | DeWalt | May 13, 1947 |
| 2,422,871 | Wilson | June 24, 1947 |
| 2,480,546 | Bryson | Aug. 30, 1949 |
| 2,522,799 | Pitcher | Sept. 19, 1950 |